United States Patent [19]
Haas

[11] Patent Number: 5,469,284
[45] Date of Patent: Nov. 21, 1995

[54] OPTICAL PACKET SWITCH

[75] Inventor: Zygmunt Haas, Holmdel, N.J.

[73] Assignee: AT&T IPM Corp., Coral Gables, Fla.

[21] Appl. No.: 58,999

[22] Filed: May 5, 1993

Related U.S. Application Data

[63] Continuation of Ser. No. 807,915, Dec. 16, 1991.

[51] Int. Cl.$^6$ ................................................. H04J 14/08
[52] U.S. Cl. ............................................ 359/139; 359/140
[58] Field of Search ................................. 359/117, 125, 359/128, 137, 138, 139, 140, 167; 370/58.1, 58.2, 58.3, 60, 94.1

[56] References Cited

U.S. PATENT DOCUMENTS

| | | | |
|---|---|---|---|
| 3,064,936 | 9/1971 | Kompfner | 359/140 |
| 3,838,278 | 9/1974 | Duguay et al. | 359/140 |
| 3,849,604 | 11/1974 | Benes et al. | 359/140 |
| 4,442,550 | 5/1984 | Killat | 359/140 |
| 4,677,618 | 6/1987 | Haas et al. | 371/1 |
| 5,065,394 | 11/1991 | Zhang | 370/94.1 |
| 5,081,622 | 1/1992 | Nassehi et al. | 370/94.1 |
| 5,091,905 | 2/1992 | Amada | 370/60 |
| 5,091,905 | 2/1992 | Amada | 370/60 |
| 5,115,428 | 5/1992 | Ramanan et al. | 359/140 |
| 5,122,892 | 6/1992 | Cloonan et al. | 359/139 |
| 5,157,654 | 10/1992 | Cisneros | 370/60 |

FOREIGN PATENT DOCUMENTS

| | | | |
|---|---|---|---|
| 51-82787 | 1/1978 | Japan | 359/140 |
| 60-90443 | 5/1985 | Japan | 359/140 |
| 0238341 | 9/1989 | Japan | 359/140 |

OTHER PUBLICATIONS

O'Reilly, Short Communication, (1975).
Haas, "The Staggering Switch": An Electronically Controlled Optical Packet Switch, IEEE 1993.
Haas, "The Staggering Switch": An Almost–All Optical Packet Switch, IEEE 1992.
K. Padmanabhan et al., "Dilated Networks for Photonic Switching," IEEE Trans. on Communications, vol. Com. 35, No. 12, Dec. 1987, pp. 1357–1365.
R. A. Spanke, "Architectures for Large Nonblocking Optical Space Switches," IEEE Jour. of Quantum Electronics, vol. QE–22, No. 6, Jun. 1986, pp. 964–967.
J. E. Watson et al., "A Low–Voltage 8×8 . . . ," IEEE Jour. of Lightwave Tech., vol. 8, No. 5, May 1990, pp. 794–801.
D. C. Opferman et al., "On a Class of Rearrangeable Switching . . . ", The Bell System Tech. Journal, vol. 50, No. 5, May–Jun. 1971, pp. 1579–1600.
D. C. Opferman et al., "On a Class of Rearrangeable Switching . . . ," The Bell System Tech. Journal, vol. 50, No. 5, May–Jun., 1971, pp. 1601–1618.
Tsukada et al., *IEEE Global Telecommunications Conference*, Dec. 2–5, 1991 "Ultrafast Photonic ATM . . . ", pp. 1230–1234. Phoenix, Ariz., USA.
Chlamtac et al., *IEEE Global Telecommunications Conf.* Dec. 2–5, 1991 "Quadro–Stars: High Performance . . . ", pp. 1224–1229 Phoenix, Ariz., USA.
Obara, *Elec. & Communications in Japan*, vol. 74, No. 1, Jan. 1991, New York, N.Y., USA, "Distributed ATM Cross–Connect Switch . . . ", pp. 55–64.

(List continued on next page.)

*Primary Examiner*—Leo H. Boudreau
*Assistant Examiner*—Rafael Barares
*Attorney, Agent, or Firm*—Gerard A. DeBlasi; John A. Caccuro

[57] ABSTRACT

An optical packet switch which receives data packets and switches those data packets in the optical domain without using recirculation devices is provided. The switch staggers the data packets in time to avoid packet collisions within the switch. The switch includes two stages that are coupled by optical delay lines. The non-blocking stages include a scheduling stage and a switching stage. Incoming data packets are received at the scheduling stage and are output to appropriate optical delay lines. The scheduling stage and the delay lines ensure that the data packets do not collide when the packets are switched at the switching stage of the optical switch.

19 Claims, 8 Drawing Sheets

OTHER PUBLICATIONS

Matsunaga, *Intl. Switching Symposium,* May 28–Jun. 1, 1990, "Photonic Switching for ATM Networks", pp. 105–110, Stockholm, Sweden.

DeVries, *Computer Communications Review,* vol. No. 4, Sep. 1990, New York, N.Y., USA, "Gauss: A Simple High Performance Switch . . . " pp. 126–134.

Tamir et al., *Real–Time Systems Symposium,* "Support for High–Priority Traffic . . . ", Dec. 6–8, 1988, pp. 191–200 Huntsville, Ala., USA.

Tamir et al., *Proceedings 15th Annual Intl Symp. Computer Architecture,* May 30–Jun. 2, 1988, "High Performance Multi–Queue . . . ", Honolulu, USA, pp. 343–354.

Frazier et al., *Proceedings 1989 IEEE Intl. Conf. Computer Design,* Oct. 2–4, 1989, "The Design and Implementation of a Multi–Queue Buffer . . . ", Massachusetts, pp. 466–471.

Listanti et al., *Computer Communications,* vol. 12, No. 6, Dec. 1989, Guildford, GB, "Switching Structures for ATM", pp. 349–358.

Rathgeb et al., *Conference Record, IEEE Global Telecom. Conf.,* "Buffering Concepts for ATM Switching . . . ", Nov. 28–Dec. 1, 1988, pp. 1277–1281, Hollywood, Calif., USA.

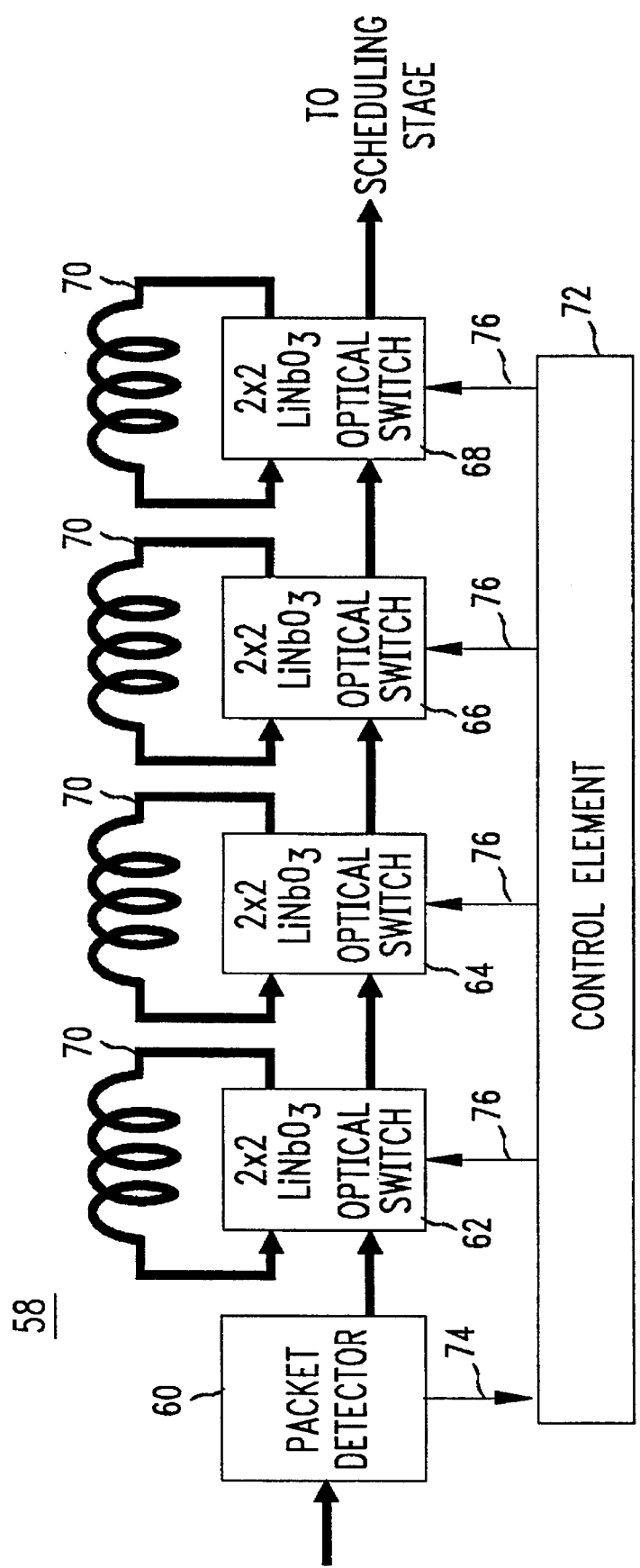

OPTICAL PACKET SWITCH

This application is a continuation of application Ser. No. 07/807,915, filed on Dec. 16, 1991.

FIELD OF THE INVENTION

This invention relates to optical packet switches and, more particularly, to optical packet switches which switch data packets in the optical domain.

BACKGROUND OF THE INVENTION

Packet switches are designed to avoid collisions of the packets of data that are being switched. Collisions of data packets occur within a switch when two data packets arrive at the inputs to the switch at the same time and are destined for the same switch output. While the switching mechanism can switch one packet to the appropriate output, the other data packet cannot be accommodated by the switching mechanism. The second data packet consequently is blocked from reaching its destination. As a result, the second data packet is destroyed and data are lost.

Optical packet switches are switches which switch data packets in the optical domain. Data packets remain as optical signals throughout the entire switching process. Optical packet switches, like other packet switches, are designed to avoid data packet collisions.

One common technique for avoiding packet collisions in an optical packet switch is to switch contending data packets into optical recirculation storage devices such as recirculating loops. An optical recirculating loop stores an optical data packet by confining the data packet in a loop of optical fiber until such time as it is desirable to extract the data packet from the loop. The stored data packets can be retrieved at a convenient time, such as when a contention no longer exists within the switch. In this way, a packet that otherwise would be destroyed is stored in the recirculating loop.

Recirculation storage devices, however, are prohibitively expensive to use. For example, recirculating loops require complex switching and control circuitry to function properly. Moreover, each recirculating loop must be provided with means for optically amplifying the recirculating data packet to compensate for losses resulting from recirculation and switching. Optical amplification adds expense and complexity to the system. It therefore would be desirable to provide an optical switch which switches data in the optical domain, but which does not rely on recirculation storage devices.

SUMMARY OF THE INVENTION

Optical recirculation storage devices are eliminated from an optical switch while simultaneously achieving improved non-blocking performance of the switch by providing a feed-forward packet delay arrangement in which dam packets are staggered in time so as to avoid collisions of data packets at the switch output.

The optical switch preferably includes two non-blocking stages which are coupled by optical delay lines of progressively larger feed-forward delays. The non-blocking stages include a scheduling stage and a switching stage. Data packets are irretrievably inserted into the delay fines by the scheduling stage. The delay lines stagger in time the arrival of the data packets at the switching stage. Data packets are staggered to resolve contentions between packets and thereby avoid packet collisions in the switching stage of the optical switch. Packets are switched to the appropriate destination by the switching stage. Data packets remain in the optical: domain throughout the switching operation.

BRIEF DESCRIPTION OF THE DRAWINGS

The above and other advantages of the invention will be apparent upon consideration of the following detailed description taken in conjunction with the accompanying drawings in which like reference numbers refer to like pans throughout and in which:

FIG. 8 is a block diagram of an illustrative embodiment of a synchronization circuit for use in the optical packet switch of FIG. 3.

DETAILED DESCRIPTION

Optical packet switching is accomplished in the optical domain accordance with the principles of the present invention by providing an all-optical switch which staggers in time contending data packets so as to avoid collisions. An exemplary embodiment of such a switch includes a scheduling stage which couples optical data packets to feed-forward optical delay lines of progressively larger delay so as to avoid packet collisions and a switching stage for completing the switching operation. Data packets enter the scheduling stage and are output via optical delay lines to the switching stage. The scheduling stage irretrievably switches (i.e., "schedules") the data packets that arrive at the switch into the delay lines in such a way that no two data packets arriving at the switching stage in a given time slot are destined for the same switch output. Collisions are avoided by resolving contentions between data packets (i.e., two packets destined for the same switch output at the same time) before the data packets arrive at the switching stage. Contentions are resolved by delaying (i.e., staggering in time) prospective colliding packets by at least one time slot. In this manner, data packets remain in the optical domain throughout the switching operation without the use of recirculation devices.

Figure 1:
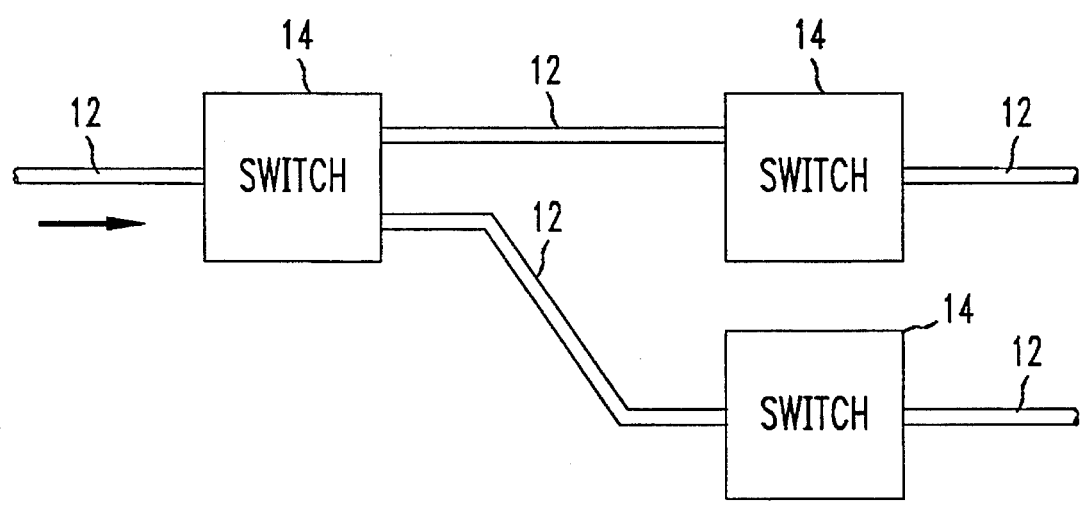
FIG. 1 is a block diagram of a portion of an optical transmission system which includes the optical packet switch of the present invention.

FIG. 1 shows an illustrative application of the optical packet switch of the present invention. A portion of a transmission system 10 is shown having several segments of optical fiber cable 12 coupled to each other via the optical packet switches 14 constructed in accordance with the principles of the present invention. Each cable 12 includes several optical fibers (not shown). Optical data packets are transmitted through cables 12 (in the direction indicated by the arrow). Data packets enter optical packet switches 14 and are switched to the appropriate destination fiber in the appropriate cable at the output of each switch 14.

Figure 2:
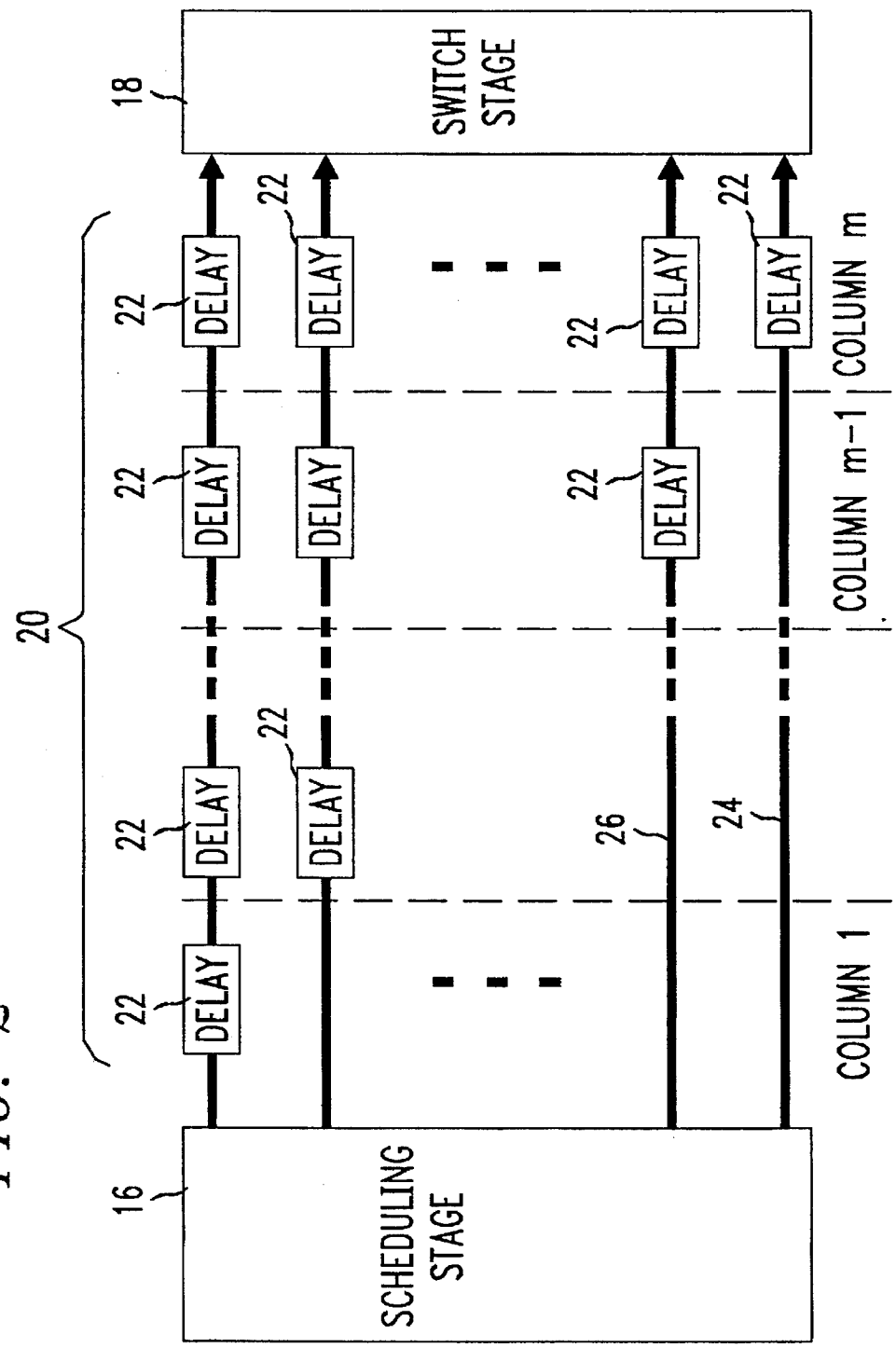
FIG. 2 is a functional block diagram of the optical packet switch of FIG. 1.

The operation of optical packet switch 4 will now be described with reference to FIG. 2. Optical packet switch 14 includes a scheduling stage 16 and a switching stage 18. Stages 16 and 18 are non-blocking stages that are coupled by optical delay lines of progressively larger feed-forward delay (designated generally by reference number 20). Scheduling stage 16 outputs data packets received from an optical fiber (such as cable 12 of FIG. 1) to appropriate ones of optical delay lines 20. Each box 22 represents a one-packet delay, that is, a time delay sufficient to transfer one packet of data between scheduling stage 16 and switching stage 18. As used herein, a one-packet delay equals one "time slot." The columns indicated on FIG. 2 represent a single time slot. For purposes of explanation herein, data packets that will reach switching stage 18 in the same time slot are described as being within the same column.

Each delay line 20 typically introduces a specific mount of delay in the transfer of data from scheduling stage 16 to switching stage 18. Generally, the delay lines introduce different amounts of delay, however several lines may introduce the same amount of delay. For example, a first delay line 24 introduces a one-packet delay (illustrated by a single box 22) between scheduling stage 16 and switching stage 18. A second delay line 26 introduces a two-packet delay, as illustrated by two boxes 22. Similarly, a straight-through path (not shown) could be provided between scheduling stage 16 and switching stage 18. The variation in delay between lines 24 and 26 enables scheduling stage 16 to stagger in time two data packets destined for the same switch output that reach switch 14 at the same time. Thus, scheduling stage 16 can cause the data packets to reach switching stage 18 at different times. Scheduling stage 16 ensures that no two packets in a time slot are destined for the same output. Scheduling stage 16 can thereby prevent collisions of those packets at switching stage 18, and thus prevent data loss.

Delay lines 20 are feed-forward and preferably deterministic in nature. Although delay lines 20 are described as delay devices, one skilled in the art will appreciate that not all of the delay lines must be pure delay. Scheduling stage 16 irretrievably inserts data packets into one of delay lines 20. A data packet output by scheduling stage 16 to one of delay lines 20 will arrive at switching stage 18 after a predetermined interval of time. In this manner, the optical switch of the present invention avoids the expense and complexity of recirculating loop technology.

Collisions of optical data packets are avoided at switching stage 18 by staggering data packets in time such that within a given time slot each data packet presented to scheduling stage 18 is routed to a different output of the switching stage. This is a direct consequence of the operation of scheduling stage 16. Scheduling stage 16 receives data packets arriving at switch 14 and inserts the data packets into delay lines of different delay such that when the data packets exit the delay lines at switching stage 18, no more than one packet is destined for any given output in the same time slot. For example, two packets that arrive at switch 14 in the same time slot and destined for the same switch output will be inserted into delay lines of different delay. The delay lines are of such delay that one of the packets will traverse the delay line in which it was inserted and clear switching stage 18 before the other packet has traversed its delay line.

One exemplary method for routing data packets arriving at switch 14 in a given time slot to different switch outputs utilizes a sequential scanning technique, as described below. The term "scanning" refers to the process by which the incoming data packets are assigned priority for switching purposes. The inputs to scheduling stage 16 are sequentially scanned beginning with the lowest numbered input. For each input packet, scheduling stage 16 attempts to insert the packet in the delay line 20 having the least amount of delay. In doing so, scheduling stage 16 ensures that no previous packet was inserted in the delay line in this time slot. Scheduling stage 16 also ensures that no other packet to the same destination (i.e., to the same output of switching stage 18) exists in the column (e.g., column m) in which the packet is to be inserted. The technique described above gives a higher priority to lower numbered inputs. Thus, the lower numbered inputs will have the smallest probability of blockage. Blockage is defined as the inability to accommodate a packet in any of the delay lines.

Other scanning techniques could be implemented for scheduling data packets on delay lines 20 so as to assign different priorities to the inputs of optical switch 14. Implementation of these techniques would be apparent to one of ordinary skill in the art in view of this disclosure. Examples of two alternative scanning techniques are a random scanning technique and an output-based priority scanning technique. The random scanning technique assigns the same priority to each input of optical switch 14. Inputs to scheduling stage 12 are scanned randomly, beginning with an arbitrary input. The output-based priority technique assigns higher priority (and therefore lower probability of blockage) to packets destined to predetermined outputs of switch 14. This technique could be used, for example, to assign higher priority to data packets carrying information to specific geographical areas. As with the sequential scanning technique, scheduling stage 16 attempts to insert data packets obtained from the scanned inputs into the delay line having the smallest delay.

Figure 3:
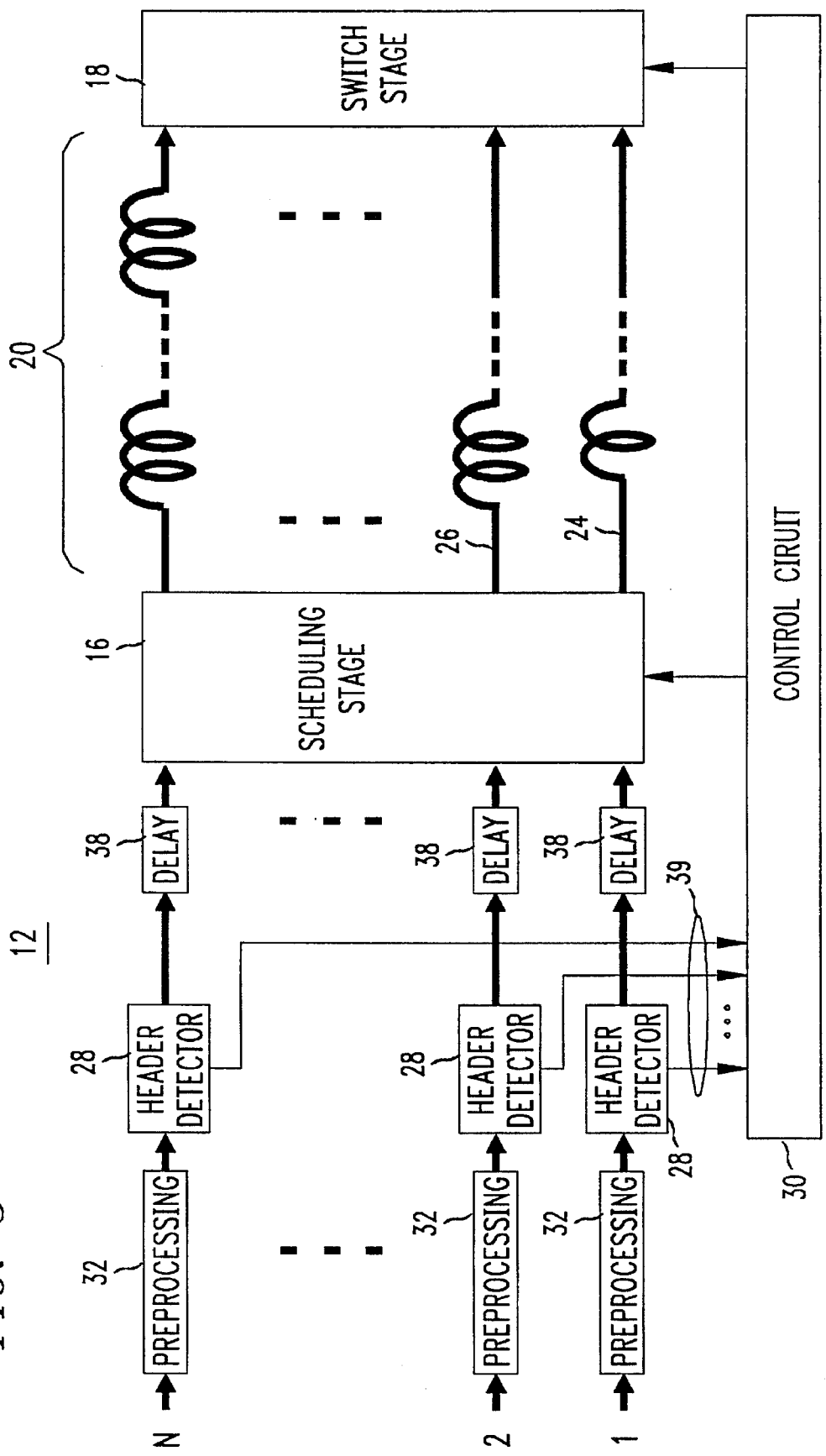
FIG. 3 is a block diagram of the architecture of the switch of FIG. 1.

FIG. 3 shows an illustrative architecture for optical packet switch 14. As described above, optical switch 14 includes scheduling stage 16 and switching stage 18, both coupled by optical delay lines 20. Switching control typically is performed electronically by element 30, but optical implementations of the switching control also are within the scope of the invention. In a preferred embodiment, optical packet switch 14 also includes a header detector 28, control circuit 30, preprocessing circuitry 32, and constant delay lines 38. Each of these elements is discussed in detail below in relation to FIG. 6.

Scheduling stage 16 is an n×m switching module having n inputs and m outputs. Switching stage 18 is an m×n switching module having m inputs and n outputs. Optical switch 14 typically includes m delay lines.

Figure 4:
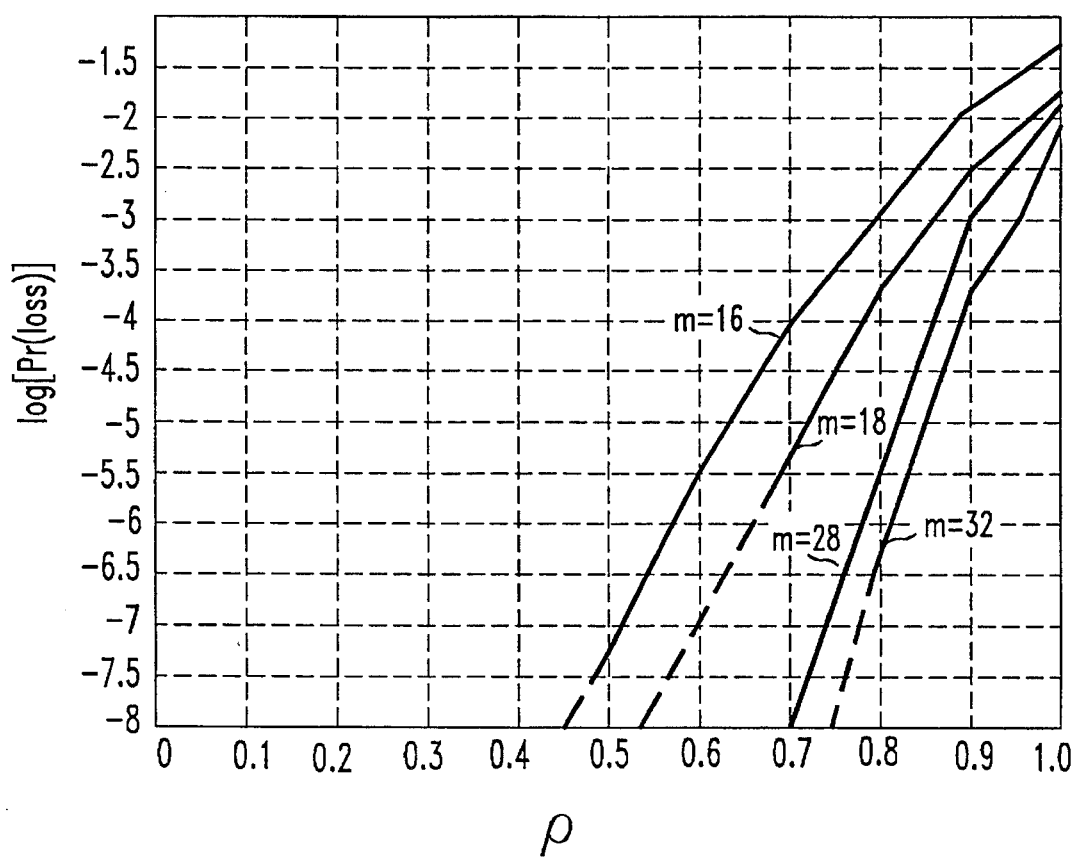
FIG. 4 is a graph of the probability of blockage for different availability of delay lines.

One performance criterion to be considered for optical packet switch 14 is the probability of blockage, discussed above. Probability of blockage refers to the probability that a randomly chosen data packet cannot be scheduled on any of optical delay lines 20, and consequently is lost. Switch performance increases as the probability of blockage decreases. Probability of blockage can be decreased by increasing the number of delay lines 20. FIG. 4 shows the decreasing probability of blockage (Pr(loss)) as a function of input line utilization $\rho$, in a switch having 16 inputs, as the number of delay lines m varies from m=16 to m=32. Input line utilization is the probability that a delay line contains a data packet in a given time slot. FIG. 4 shows the probability of blockage expressed in log notation as log[Pr(loss)].

Scheduling stage 16 and switching stage 18 may be implemented as rearrangeably non-blocking networks. Rearrangeably non-blocking networks have the property that any permutation of the inputs to the network can be achieved at the outputs of the network without blocking (i.e., losing) data. The switching network used to construct scheduling stage 16 and switching stage 18 may be implemented in a variety of ways. In an exemplary embodiment of the invention, the switching networks of stages 16 and 18 are implemented as Benes networks.

Figure 5:
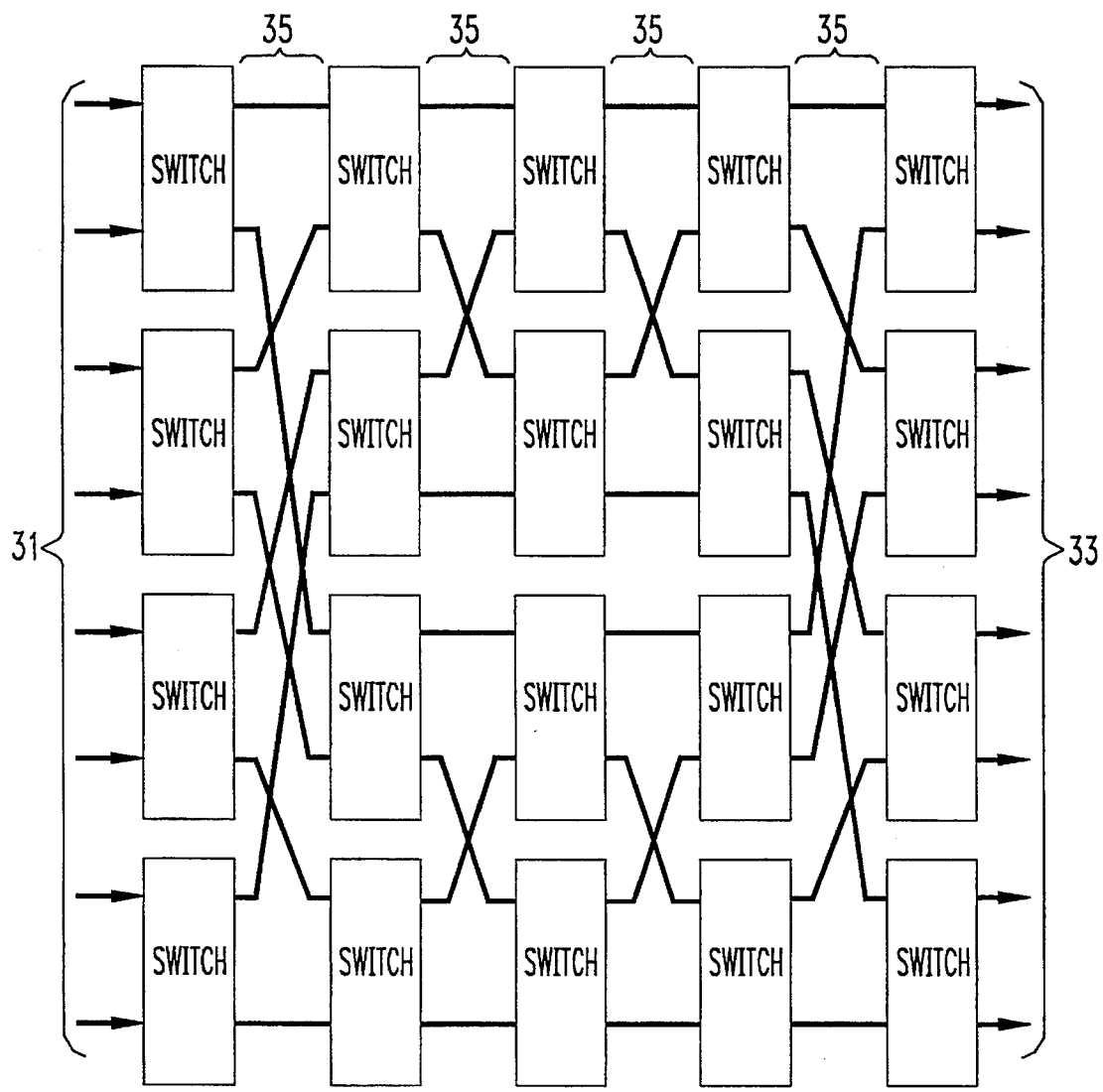
FIG. 5 is a block diagram of a Benes network suitable for use in the scheduling and switching stages of FIG. 3.

FIG. 5 illustrates an 8×8 Benes network. Benes networks have the property that they permit any of inputs 31 to be connected to any of outputs 33 without blocking provided that no two inputs are to be connected to the same output and that connections 35 within the switching fabric can be rearranged. Optical Benes networks suitable for use with the present invention can be constructed as disclosed by Watson et al., "A Low-Voltage 8×8 Ti:LiNbO$_3$ Switch With a Dilated-Benes Architecture," *Journal of Lightwave Technology*, Vol. 8, No. 5, May 1990, pp. 794–801.

Although the switching networks of stages 16 and 18 have been described in the context of a Benes network, one skilled in the art of optical switching will appreciate that the switching networks could alternatively be constructed using other switching architectures. These alternative architectures include, for example, Clos, Banyan, Omega and Shuffle networks. Irrespective of the implementation chosen, the switching networks which form stages 16 and 18 are designed so as to minimize optical signal attenuation (loss), cross-talk, and blocking probability.

Optical delay lines 20 typically may be implemented using a single optical fiber for each delay line. Variations in delay from one delay line to the next are achieved by providing optical fibers of increasing length. Assuming all data packet are approximately the same size (i.e., time duration), a one-packet delay line is provided using an optical fiber of predetermined length (the appropriate length of which is readily determinable by one of ordinary skill in the an). Multiple-packet delay lines are implemented by providing optical fibers of a length which is an appropriate multiple of the length of a one-packet delay line. For example, if a one-packet delay is provided by a fiber 1000 meters in length, a two-packet delay line is constructed by providing a fiber 2000 meters in length. Although delay lines 20 typically introduce different amounts of delay, several of delay lines 20 may introduce substantially the same predetermined delay.

As discussed with reference to FIG. 3, the data path of optical packet switch 14 is fully optical, but control within the switch typically is performed electronically. A portion of each optical data packet entering switch 14 is control information. The control information includes, for example, the destination address of the data packet. This control information is extracted from the optical data packets by a header detector 28. Each of header detectors 28 converts the control information of data packets on its respective input line (see FIG. 3) from the optical domain into the electrical domain. Header detector 28 then routes the converted information (now an electrical signal) to control circuit 30 for processing.

Figure 6:
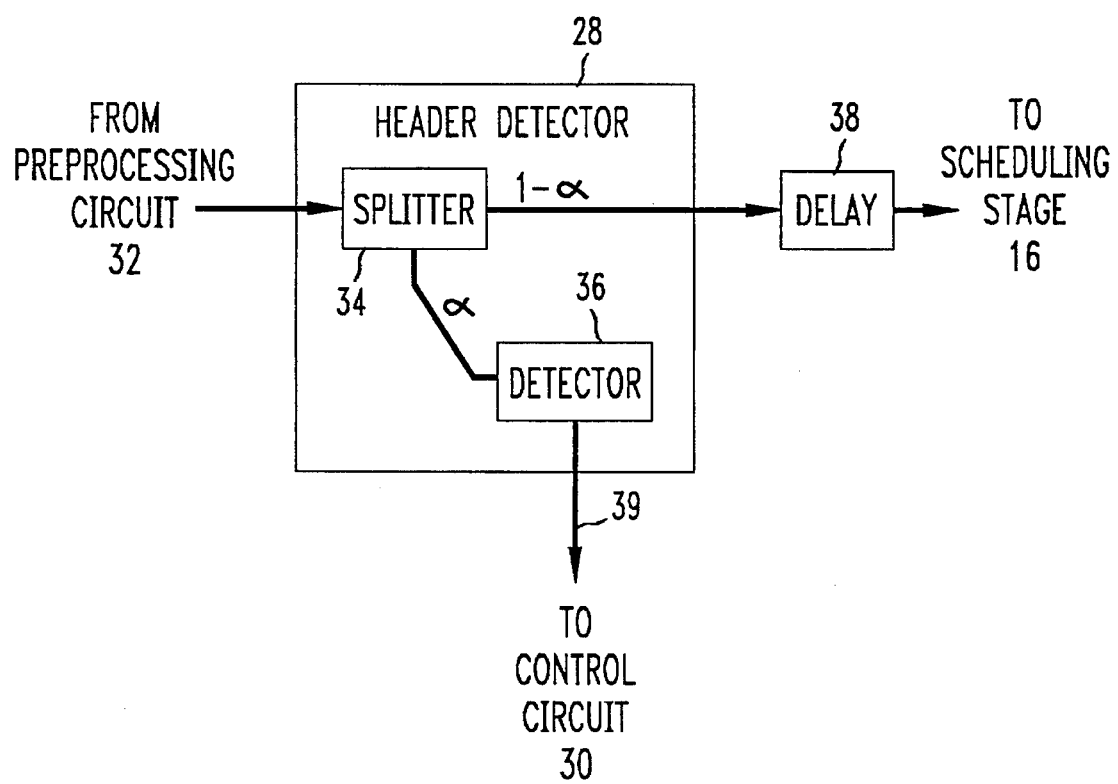
FIG. 6 is a schematic diagram of the detector circuit of FIG. 3.

Header detector 28, shown in FIG. 6, includes a splitter 34 and an optical detector 36. Splitter 34 receives optical data packets from preprocessing circuitry 32. Splitter 34 splits the optical energy of the incoming data packet into two optical components in a predetermined ratio. Splitter 34 outputs one component α (for use as control information) to optical detector 36. Splitter 34 outputs a second component 1—α (for use as data signal) to scheduling stage 16. As shown in FIG. 3, a constant optical delay line 38 is disposed in series between splitter 34 and scheduling stage 16 to introduce a time delay in the passage of the optical data between header detector 28 and scheduling stage 16. The time delay permits the control information to be convened into an electrical signal by optical detector 36 and to be operated upon by control circuit 30 (e.g., setting the scheduling stage module) before the optical dam reaches scheduling stage 16. Splitters suitable for use in accordance with the principles of the invention are commercially-available, for example, from Coming Fibers, Inc. or Gould, Inc.

Optical detector 36 converts optical signals received from splitter 34 into electrical signals. The electrical signals drive control circuit 30. Each of optical detectors 36 transmits electrical signals to control circuit 30 via a respective one of lines 39. In an illustrative embodiment, optical detector 36 is a low speed detector configured to implement a field coding scheme as disclosed in commonly-owned, co-pending U.S. patent application Ser. No. 07/630,145, filed Dec. 19, 1990. The field coding scheme permits optical detector 36 to process data at a rate substantially slower than the optical data rate of the transmission system because only the control or header information is processed therein. Detectors suitable for use in accordance with the principles of the invention are commercially available from American Telephone & Telegraph, Inc.

Control circuit 30 performs three key functions. Control circuit 30 first determines the delay line 20 to which each data packet arriving at switch 14 will be connected. Control circuit 30 then sets switches within scheduling stage 16 to couple the incoming data packet with the appropriate delay line. At the appropriate time, control circuit 30 also sets switches within switching stage 18 to implement the required switching operation to route the data packet to its desired destination. Control circuit 30 preferably is implemented in hardware because of the high speed required to perform the scheduling operation.

Figure 7:
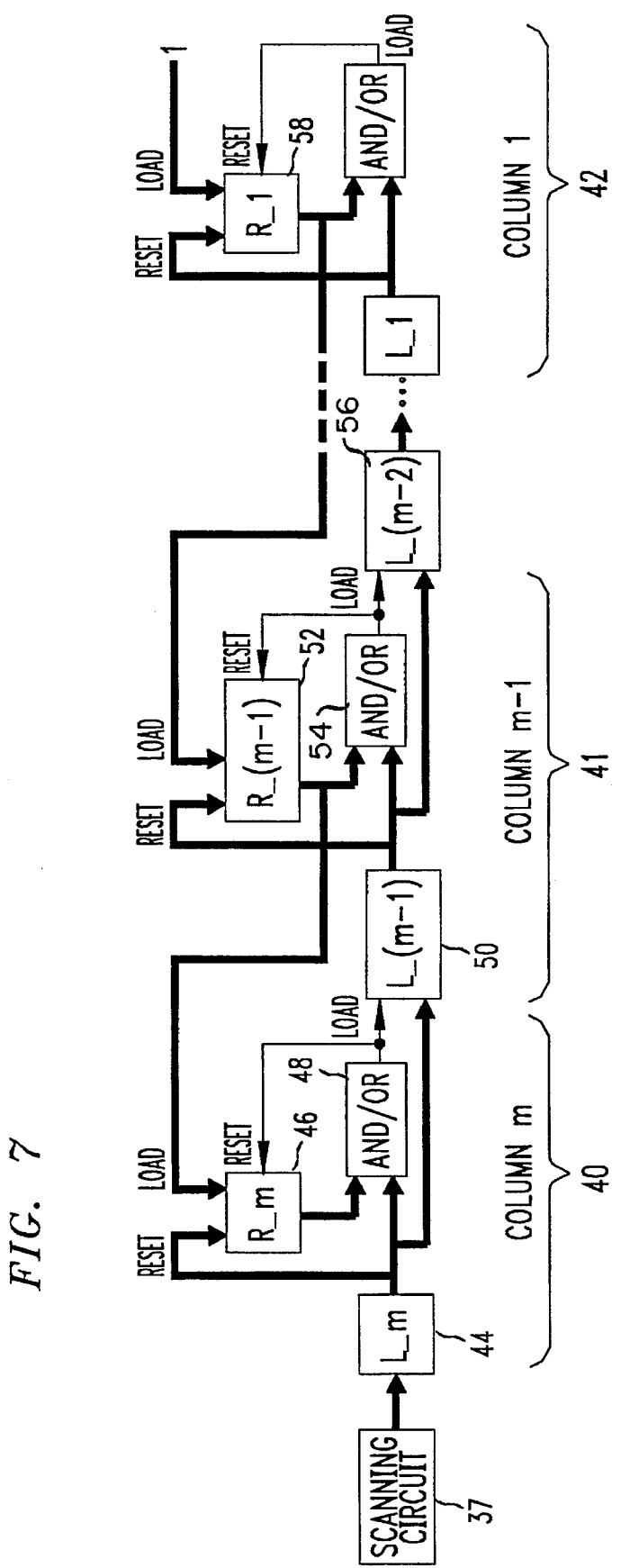
FIG. 7 is a schematic diagram of the control circuitry of FIG. 3.

An exemplary embodiment of control circuit 30 is shown in FIG. 7. The circuit of FIG. 7 is used when switch 14 operates in a synchronous mode, with all data packets arriving synchronously at scheduling stage 16. While control circuit 30 is described for synchronous switch operation, it is only for illustrative purposes to understand the invention and not for purposes of limitation. In other embodiments, control circuit 30 could control packet scheduling and switching for asynchronous switch operation. In view of the description herein, suitable control circuitry for asynchronous switch operation is deemed apparent to one of ordinary skill in the art.

Control circuit 30 includes a scanning circuit 37 and several stages 40, 41, and 42 of registers and combinational circuitry. Control circuit 30 includes a separate stage which corresponds to each column of FIG. 2. However, for discussion purposes, only stages 40, 41, and 42 are shown and described.

Scanning circuit 37 receives information from each of header detectors 28. This information specifies the output (destination) address of each data packet arriving at optical switch 14. Scanning circuit 37 outputs the output addresses according to scanning techniques such as the techniques discussed above (e.g., sequential or random scanning) to stage 40 for processing. One skilled in the art will readily appreciate that a variety of circuits could be used to implement scanning circuit 37.

Stage 40 includes a latch 44, a register 46, and combinational logic 4.8. Latch 44 stores output address data received from scanning circuit 37. Register 46 stores a vector containing the output addresses of all data packets in column m of FIG. 2. The contents of latch 44 and register 46 are compared in combinational logic 48. The operation of stage 40 is described below.

Control circuit 30 includes two system clocks: the $\text{clock}_{slot}$ and the $\text{clock}_{line}$. $\text{clock}_{slot}$ ticks once every time slot while the $\text{clock}_{line}$ ticks at least (n+m) times for every $\text{clock}_{slot}$ tick, where n is the number of switch inputs and m is the number of available delay lines 20. The number of delay lines preferably equals or exceeds the number of switch inputs. At every tick of the $\text{clock}_{slot}$ a new set of up to n data packets arrive at optical switch 14. Scanning circuit 37 loads the output address of a single arriving packet into latch 44 of control circuit 30 with every tick of the $\text{clock}_{line}$. During the tick of the $\text{clock}_{line}$, the packet destination address is checked against the content of register 46. If the contents of latch 44 indicate a packet destination address already present in register 46 (i.e., two packets are contending for the same switch output in the time slot that corresponds to stage 40), the output of combinational logic 48 has a logical value of one. The contents of latch 44 are then loaded into latch 50 of stage 41. If the contents of latch 44 do not indicate a packet destination address already present in register 46 (i.e., no other packet has been previously scheduled for the same switch output in that time slot), the logical OR of the contents of latch 44 and register 46 is stored in register 46. In this way, the data packet described by the contents of latch 44 is "scheduled" in stage 40 (i.e., it is scheduled in the time slot of column m). Latch 50 is not loaded in this case.

This process continues for all packets arriving within a given time slot. Output addresses of subsequent data packets are loaded sequentially from the scanning circuit into latch 44. The operation is repeated for each data packet.

Operations performed by stage 40 are repeated in stages 41, 42, and any intermediate stages between stages 41 and 42 (not shown). For example, the contents of latch 50 are then compared with the contents of register 52 of stage 41. If the contents of latch 50 indicate a packet destination address already present (i.e., scheduled) in register 52, the output of combinational logic circuitry 54 causes the contents of latch 50 to be stored in latch 56 of the next stage. This process is continued until all incoming packets in a given time slot have been analyzed.

Each occurrence of $\text{clock}_{slot}$ (corresponding to a new time slot) causes the contents of a given register to be loaded into the next lowest register (i.e., the contents of register 52 are transferred to register 46, and so on). The contents of register 46 can be over-written because the occurrence of a new $\text{clock}_{slot}$ indicates that the data packets previously in column m (stage 40) have passed through delay lines 20 and have been switched by switching stage 18. Registers 58 is reset.

In addition to the circuitry described above, optical packet switch 14 typically may include preprocessing circuitry 32. Preprocessing circuitry 32 may include, for example, commercially-available polarization controllers (not shown) for properly polarizing light before the light enters scheduling stage 16. As another example, preprocessing circuitry 32 may include optical amplifiers (also not shown), which may be desirable in certain instances. For example, if the optical data packets must pass through several switches, some type of optical amplification may be desirable.

Preprocessing circuitry 32 also may include a synchronization circuit for properly aligning (i.e., synchronizing) the arrival of data packets at scheduling stage 16, for synchronous switch operation. FIG. 8 shows one illustrative embodiment of a suitable synchronization circuit 58. Synchronization circuit 58 includes a packet detector 60, optical switches 62, 64, 66, and 68, optical delay lines 70, and a control element 72. Optical switches 62, 64, 66, and 68 are 2×2 $\text{LiNbO}_3$ switches which can either pass data directly to an adjacent switch or cause the data to pass through a respective one of optical delay lines 70. Suitable optical switches are commercially available, for example, from America Telephone & Telegraph, Inc. Optical delay lines 70 are fiber lines of sufficient length to introduce a 0.25 packet delay.

Synchronization circuit 58 operates as follows. Optical data packets enter packet detector 60. Packet detector 60 passes most of the optical energy of an entering data packet to switch 62. Packet detector 60 converts the remaining portion of the optical energy into an electrical signal. (In a preferred embodiment, the function of packet detector 60 is combined with that of header detector 28.) The electrical signal is sent to control element 72 via line 74. Control element 72 determines the delay required to synchronize the incoming packet, and sets switches 62, 64, 66, and 68 (via control lines 76) as appropriate to introduce the required delay. Switch 68 outputs the data packet to header detector 28 (see FIG. 3).

It will be understood that the foregoing is merely illustrative of the principles of the invention and not for purposes of limitation. Various modifications can be made by those skilled in the art without departing from the scope and spirit of the invention. For example, the scheduling technique and control circuit 30 may be modified to maintain the sequence of data packets arriving at switch 14. A pointer (or several pointers) is provided to keep track of the packets destined for each output of switch 14. The pointer ensures that each data packet destined for a predetermined switch output is placed on a delay line of longer delay than are packets destined for the same output which arrived at the switch earlier in time. Thus, if a packet arrived at switch 14 for output j and was scheduled on delay line $d_a$, a second packet arriving for output j can be scheduled only on delay line $d_b$, where $d_b$ is of longer delay than $d_a$. The scope of this invention is limited only by the claims that follow.

I claim:

1. An optical packet switch having a plurality of inputs for receiving optical data packets and a plurality of outputs, comprising:

means for detecting contentions between ones of the plurality of optical data packets for an output of the optical packet switch;

optical delay line means for staggering in time, in a feed-forward manner, the plurality of optical data packets so that collisions of optical data packets contending for the same output of the optical packet switch are avoided at a means for switching, said staggering means being coupled to the switching means; and switching means for switching in the optical domain a plurality of optical data packets received at the plurality of inputs to selected ones of the plurality of outputs of the optical packet switch.

2. The apparatus of claim 1 wherein the means for staggering comprises:

a plurality of feed-forward optical delay lines, at least two of the plurality of optical delay lines being of different delay; and means for selecting ones of the plurality of optical delay lines for transmitting predetermined optical data packets to the means for switching so that optical data packets contending for an output of the optical packet switch arrive at the means for switching staggered in time.

3. The apparatus of claim 2 wherein the means for selecting comprises:

a switching module having a plurality of switch elements for coupling the plurality of inputs of the optical switch with ones of the plurality of optical delay lines;

means for determining through which of the plurality of optical delay lines each of the optical data packets received at the plurality of inputs shall be transmitted; and means for setting the plurality of switch elements so as to couple ones of the plurality of inputs with ones of the plurality of optical delay lines, the setting means being responsive to the determining means.

4. The apparatus of claim 1 wherein the detecting means comprises means for extracting from an optical data packet information identifying a predetermined one of a plurality of outputs to which the optical data packet is to be switched.

5. An optical packet switch having a plurality of inputs for receiving optical data packets and a plurality of outputs, comprising:

means for detecting contentions between ones of the plurality of optical data packets for an output of the optical packet switch;

a plurality of feed-forward optical delay lines coupled to a means for switching, at least two of the plurality of optical delay lines being of different delay;

means for coupling predetermined ones of the plurality of inputs to selected ones of the plurality of optical delay lines to delay in time arrival of predetermined ones of the optical data packets at the means for switching so that contentions between the predetermined optical data packets for ones of the plurality of outputs are resolved, the coupling means being responsive to the detecting means; and means for switching in the optical domain optical data packets received at the plurality of inputs to selected ones of the plurality of outputs of the optical packet switch.

6. The apparatus of claim 5, further comprising means for synchronizing arrival of the optical data packets at the plurality of inputs, the synchronizing means being coupled to the plurality of the inputs.

7. The apparatus of claim 5, wherein the means for coupling comprises:

a switching module having a plurality of switches for coupling ones of the plurality of inputs with ones of the plurality of optical delay lines;

means for determining through which of the plurality of optical delay lines the optical data packets received at the plurality of inputs shall be transmitted; and means for setting the plurality of switches so as to couple ones of the plurality of inputs with ones of the plurality of optical delay lines, the setting means being responsive to the determining means.

8. The apparatus of claim 7, wherein the means for switching and the switching module comprise a switching fabric network selected from among the group consisting of Benes, Clos, Banyan, Omega, and Shuffle networks.

9. The apparatus of claim 7, wherein the means for determining further comprises means for preserving packet order of the optical data packets received at the plurality of inputs.

10. The apparatus of claim 5 wherein the detecting means comprises means for extracting from an optical data packet information identifying the predetermined one of the plurality of outputs to which the optical data packet is to be switched, the extracting means being coupled to the determining means to provide said information to the determining means.

11. The apparatus of claim 7, wherein the means for determining operates in a synchronous mode.

12. The apparatus of claim 7, wherein the means for determining operates in an asynchronous mode.

13. A method for switching optical packets within an optical packet switch having a plurality of inputs for receiving optical data packets and a plurality of outputs, comprising the steps of:

detecting contentions between at least two optical data packets destined for the same output of the optical packet switch;

coupling predetermined ones of the plurality of inputs to selected ones of a plurality of optical delay lines of progressively larger feed-forward delay so as to delay in time arrival of predetermined ones of the optical data packets to a means for switching so that contentions between the optical data packets for ones of the plurality of outputs of the optical packet switch are resolved; and switching in the optical domain the plurality of optical data packets.

14. The method of claim 13, further comprising the step of synchronizing arrival of the optical data packets at the plurality of inputs.

15. The method of claim 13, wherein the coupling step comprises:

determining through which of the plurality of optical delay lines each of the optical data packets received at the plurality of inputs shall be transmitted; and setting, in response to the determining step, a plurality of switches to couple predetermined ones of the plurality of inputs with predetermined ones of the plurality of optical delay lines.

16. The method of claim 13, further comprising the step of preserving packet order of the optical data packets received at the plurality of inputs.

17. An optical packet switch having a plurality of outputs, comprising:

means for detecting contentions between at least two optical data packets destined for the same output of the optical packet switch;

a plurality of optical delay lines, at least two of the plurality of optical delay lines being of different delay;

means for selecting ones of the plurality of optical delay lines for transmitting predetermined optical data packets to a means for switching so that optical data packets contending for an output of the optical packet switch arrive at the means for switching staggered in time to avoid collisions at the means for switching, the selecting means being responsive to the detecting means; and means for switching in the optical domain a plurality of optical data packets to selected outputs of the optical packet switch.

18. The apparatus of claim 17 wherein the means for selecting comprises:

a switching module having a plurality of switch elements for coupling a plurality of inputs of the optical switch with ones of the plurality of optical delay lines;

means for determining through which of the plurality of optical delay lines each of the optical data packets received at the plurality of inputs shall be transmitted; and means for setting the plurality of switch elements so as to couple ones of the plurality of inputs with ones of the plurality of optical delay lines, the setting means being responsive to the determining means.

19. The apparatus of claim 17, wherein the detecting means comprises means for extracting from an optical data packet information identifying a predetermined one of a plurality of outputs to which the optical data packet is to be switched, the extracting means being coupled to the determining means to provide said information to the determining means.

* * * * *